US011956011B2

United States Patent
Patterson et al.

(10) Patent No.: US 11,956,011 B2
(45) Date of Patent: Apr. 9, 2024

(54) ARCHITECTURE, APPARATUS, AND POWER DELIVERY METHOD FOR ENVIRONMENTAL MEASUREMENT IN SUBSEA SYSTEM

(71) Applicant: SUBCOM, LLC, Eatontown, NJ (US)

(72) Inventors: William W. Patterson, Freehold, NJ (US); Georg Heinrich Mohs, East Brunswick, NJ (US); Alexei N. Pilipetskii, Colts Neck, NJ (US)

(73) Assignee: SubCom, LLC, Eatontown, NJ (US)

( * ) Notice: Subject to any disclaimer, the term of this patent is extended or adjusted under 35 U.S.C. 154(b) by 0 days.

(21) Appl. No.: 17/889,950

(22) Filed: Aug. 17, 2022

(65) Prior Publication Data

US 2024/0063901 A1    Feb. 22, 2024

(51) Int. Cl.
    H04B 10/02    (2006.01)
    H04B 10/077   (2013.01)
    H04B 10/29    (2013.01)
    H02G 9/02     (2006.01)

(52) U.S. Cl.
    CPC ......... *H04B 10/0777* (2013.01); *H04B 10/29* (2013.01); *H02G 9/02* (2013.01)

(58) Field of Classification Search
    CPC .. H04B 10/0777; H04B 10/29; H04B 10/806; H04B 10/807; H04B 10/808; H04B 10/40; H04B 10/80; H04B 10/0793; H04B 10/0797; H04B 10/0795; H04B 10/2507

USPC ..... 398/104, 105, 79, 141, 158, 159, 33, 38, 398/25, 171, 135, 136, 173, 175, 176, 398/177, 181, 179, 160, 30, 31, 32, 34, 398/37
    See application file for complete search history.

(56) References Cited

U.S. PATENT DOCUMENTS

| 8,682,159 | B2 * | 3/2014 | Kovsh ..................... H04J 14/02 398/31 |
| 9,979,491 | B2 | 5/2018 | Greene |
| 10,608,830 | B2 * | 3/2020 | Yang ........................ H04Q 9/00 |
| 2004/0109228 | A1 | 6/2004 | Aronstam |
| 2005/0259264 | A1 * | 11/2005 | Munehira ............ H04B 10/291 356/450 |
| 2005/0259998 | A1 * | 11/2005 | Fujieda .............. H04B 10/0777 398/186 |

FOREIGN PATENT DOCUMENTS

JP          7021976  B2    2/2022

OTHER PUBLICATIONS

European Search Report for EP Application No. 23188708.4, dated Jan. 17, 2024, 10 pages.

* cited by examiner

*Primary Examiner* — Hanh Phan

(74) *Attorney, Agent, or Firm* — KDW Firm PLLC

(57) ABSTRACT

An apparatus for subsea environment sensing. In one aspect, the apparatus may include a repeater assembly, disposed in an optical repeater; and an environmental sensor assembly, disposed proximate to the repeater assembly, the environmental sensor assembly being coupled to receive power from the repeater assembly over an optical link.

18 Claims, 4 Drawing Sheets

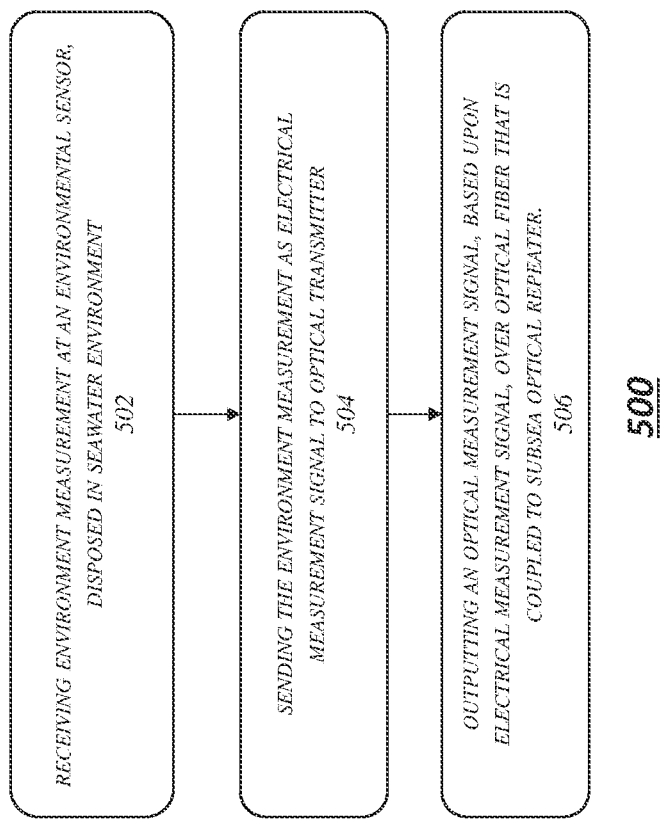

ARCHITECTURE, APPARATUS, AND POWER DELIVERY METHOD FOR ENVIRONMENTAL MEASUREMENT IN SUBSEA SYSTEM

BACKGROUND

Field of the Invention

Embodiments of the present disclosure relate to the field of subsea communication systems. More particularly, the present disclosure relates to a power delivery approach for environmental sensing in a subsea system.

Discussion of Related Art

Long-haul optical communication systems, such as submarine optical communication systems, may include numerous interconnected optical cables to facilitate the communication of data and information. For transmission over long distances, such as hundreds of kilometers or thousands of kilometers, optical communications systems are provided with installations called repeaters. The repeaters may be placed at intervals of 50 km, 100 km, and so forth, and include components to amplify the optical signal. Power may be provided to optical communications components, including repeaters, via electrical wires or cables that may transmit DC current at high voltage along the subsea communications route. Recently, approaches have been developed to employ subsea optical communications fibers as sensing elements for sensing the environment near an optical cable. However, using sensing elements that are external to a subsea cable may also be useful. However, such additional elements may tend to degrade the reliability of the optical communications system if placed inside a repeater, for example. Moreover, coupling sensing elements that sense a seawater environment to optical repeater controllers or electronics may be difficult, since the optical repeater electric potential may differ from the ground potential of sweater by tens of thousands of volts.

With respect to these and other considerations, the present disclosure is provided.

BRIEF SUMMARY

In one embodiment, an apparatus for subsea environment may include a repeater assembly, disposed in an optical repeater; and an environmental sensor assembly, disposed proximate to the repeater assembly, the environmental sensor assembly being coupled to receive power from the repeater assembly over an optical link.

In another embodiment, a subsea communications system is provided, including a subsea cable; and an optical repeater coupled to the subsea cable, to receive power from the subsea cable, where the optical repeater further includes a repeater assembly. The subsea communications system may further include an environmental sensor assembly, disposed proximate to the repeater assembly, where the environmental sensor assembly is coupled to receive power from the repeater assembly over an optical link.

In a further embodiment, a method of monitoring a subsea environment may include receiving an environment measurement at an environmental sensor of an environmental sensor assembly, disposed in contact with seawater. The method may include sending the environment measurement as an electrical measurement signal to an optical transmitter; and outputting an optical measurement signal, based upon the electrical measurement signal, over an optical fiber of an optical fiber assembly that is coupled to a repeater assembly in a subsea optical repeater.

BRIEF DESCRIPTION OF THE DRAWINGS

FIG. 5 presents an exemplary process flow.

DESCRIPTION OF EMBODIMENTS

Figure 1:
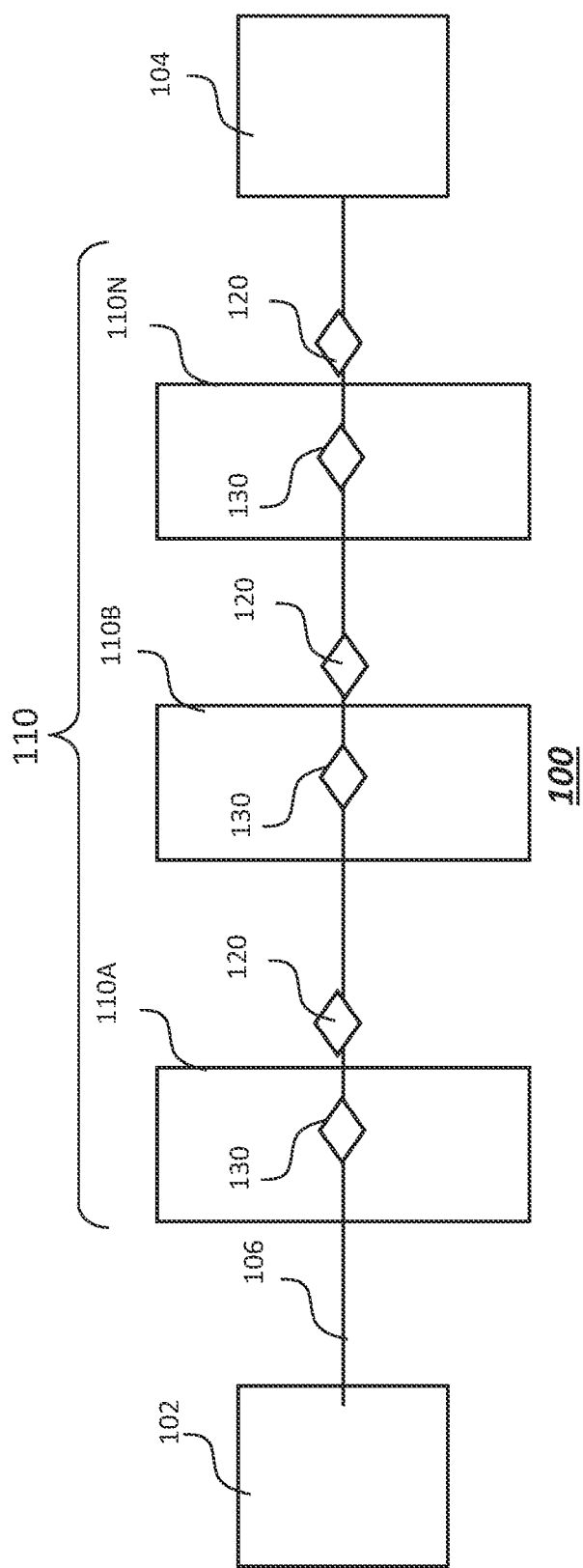
FIG. 1 illustrates an example optical communication system.

The present embodiments are directed to at least a subsea environmental sensing system. According to various embodiments and as will be further described in detail below, a sensing system may include a temperature sensor apparatus that is associated with a subsea optical repeater or a pressure sensor apparatus that is associated with a subsea optical repeater.

The present embodiments will now be described more fully hereinafter with reference to the accompanying drawings, in which various embodiments are shown. The subject matter of this disclosure, however, may be embodied in many different forms and should not be construed as limited to the embodiments set forth herein. Rather, these embodiments are provided so that this disclosure will be thorough and complete, and will fully convey the scope of the inventive concept to those skilled in the art. In the drawings, like numbers refer to like elements throughout.

Referring to the drawings, FIG. 1 illustrates an exemplary subsea communications system 100, according to embodiments of the disclosure. The subsea communications system 100 includes at least one optical repeater, which repeater may form part of a subsea optical communications system that spans hundreds of kilometers or up to several thousands of kilometers. The subsea communications system 100 be employed, at least in part, to conduct bidirectional optical communications through optical fibers, as known in the art. As shown in FIG. 1, the subsea communications system 100 includes a pair of terminals that are shown as a first station 102, and a second station 104, where each of these stations may be terrestrial stations, and may be located at opposite ends to the subsea communications system 100, in order to transmit and receive optical communications over a device, such as a cable 106. Bi-directional data transmission may be implemented by constructing pairs of optical fibers within the cable 106.

In the embodiment of FIG. 1, the subsea communications system 100 includes a plurality of optical repeaters 110, shown as optical repeater 110A, optical repeater 110B, and optical repeater 110N, where the spacing between optical repeaters may be on the order of tens of kilometers to hundreds of kilometers, in various non-limiting embodiments. Each repeater of optical repeaters 110 may include known components, such as optical amplifiers. Optical amplifiers may utilize, for example, Erbium-Doped Fiber Amplifiers (EDFAs) or other rare earth doped fiber amplifiers, Raman amplifiers, or semiconductor optical amplifiers (SOAs).

The subsea communications system 100 may further include at least one specialized measurement apparatus, shown as temperature measurement apparatus 120. In some non-limiting embodiments, the temperature measurement apparatus 120 may be located proximate to a respective one of the optical repeaters 110, as depicted in FIG. 1. The operation of these temperature measurement apparatus 120 is described in detail below. In brief, the temperature measurement apparatus 120 may function as an environmental sensor assembly to provide local information about the environment proximate to a given optical repeater, such as a thermal or temperature sensor that measures the ocean or seabed temperature at the seabed level. In particular, the temperature measurement apparatus 120 may be collocated with and be part of a housing that encloses a cable joint that is used to connect a first portion of a subsea cable to a second portion of the subsea cable. As detailed below, the temperature measurement apparatus 120 may include temperature sensing components as well as related components that are in communication with components located in a proximate subsea optical repeater. As used herein, the terms "proximate to" or "proximate" may mean within a distance of less than or equal to one kilometer (km). Thus, a temperature measurement apparatus 120 may be said to be proximate to a subsea optical repeater when located at a distance of 1 km or less from the subsea optical repeater.

Alternatively, or in addition, the subsea communications system 100 may further include at least one pressure measurement apparatus 130 inside one or more of the optical repeaters 110. In some non-limiting embodiments, the sensor may be located in one of the optical repeaters 110, as depicted in FIG. 1. In brief, the pressure measurement apparatus 130 may function as a pressure sensor to provide local information about the environment at a given optical repeater.

Figure 2:
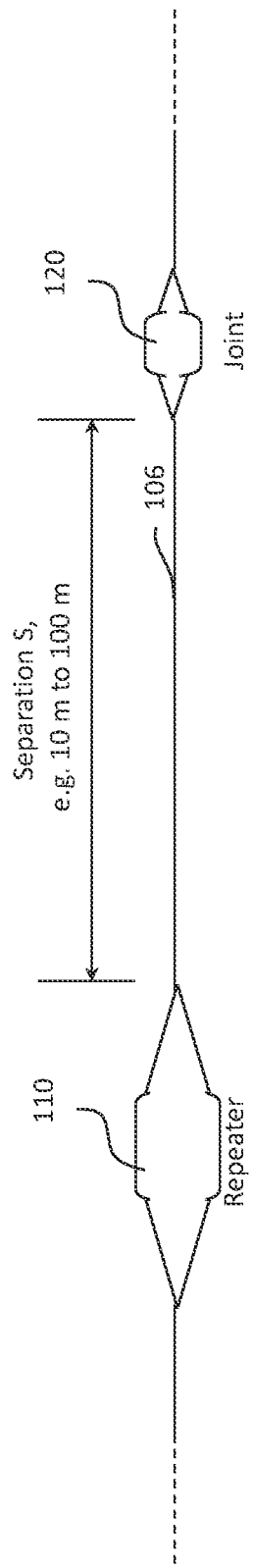
FIG. 2 illustrates a close up view of an exemplary arrangement for temperature sensing.

Turning now to FIG. 2, there is shown a close up view of an exemplary arrangement for temperature sensing. As illustrated, a subsea cable, shown as cable 106, extends through an optical repeater 110, which repeater may represent one or more optical repeaters that are disposed through a subsea optical communications system, at appropriate spacings from one another, such as tens of kilometers to hundreds of kilometers. The subsea cable 106 further extends through a temperature measurement apparatus 120, which apparatus may include a cable joint as noted above. In various non-limiting embodiments, the temperature measurement apparatus 120 may be disposed at a distance in the range of 5 m to 100 m from the optical repeater 110, and in some embodiments up to 1000 m (1 km). The exact distance that separates the temperature measurement apparatus 120 from the optical repeater 110 may be outside the aforementioned distance range limits in additional embodiments. In order to achieve high sensor accuracy, the temperature measurement apparatus 120 should be placed with sufficient separation from the optical repeater 110, so that heat generated by the optical repeater 110 does not perturb the targeted measurement of temperature of the sea/seabed environment, where the assumption is that the temperature measurement includes no artifacts from localized artificial heat sources. In addition, to maintain high reliability of the optical transmission system that includes the optical repeaters 110, the placement and operation of the temperature measurement apparatus 120 is designed to minimally impact optical transmission reliability.

In accordance with various embodiments of the disclosure, the optical repeaters 110 may include components to communicate signals to and from the temperature measurement apparatus 120. These signals may include outgoing power signals transmitted from an optical repeater 110 to the temperature measurement apparatus 120 to provide power to conduct a temperature measurement, or control signals to conduct the temperature measurement. These signals may further include incoming signals received from the temperature measurement apparatus 120, including temperature measurement information. In accordance with different embodiments, temperature measurements may be conducted automatically, at predetermined intervals, may be conducted upon command, or by other suitable procedure. In one implementation, temperature measurements may be conducted longitudinally over intervals of months, years, or decades, in order to monitor temperature changes over these relatively long intervals. Because a given temperature measurement apparatus 120 may be collocated near to each of the optical repeaters 110 according to one embodiment, geothermal subsea temperature mapping may be achieved at intervals corresponding to the repeater separation and over large total distances that are concomitant with the length of a subsea cable, such as several thousand kilometers.

One consideration that may impact reliable operation of an environmental sensor such as the temperature measurement apparatus 120, or a pressure measurement apparatus 130 (see also FIG. 4, below), is the high voltages that are required to operate a subsea optical communications system. Known subsea optical transmission systems may be powered by DC current, where the system voltage is determined by the number of subsea optical repeaters and the length of the cable, such that a higher voltage is required as the transmission distance increases. This voltage may readily exceed 10,000 V for example, such as voltages up to −18 kV to +18 kV in some non-limiting embodiments. Accordingly, in order for the optical repeater 110 to electrically communicate with a thermal sensor in the temperature measurement apparatus 120, in principle, the temperature sensing components could be electrically coupled over an electrical cable wire to the optical repeater 110, such that the temperature sensing component are also held at such high voltages with respect to ground. However, because these temperature-sensing components may be located in a small enclosure, such as a metal cylinder, maintaining reliable operation at 10,000 V or higher with respect to ground may be challenging. Similar considerations apply to the use of a pressure sensor in conjunction with a repeater. Particularly, the pressure sensor may be in contact with the seawater, which is at ground potential. As detailed below, the present embodiments address this issue by providing an apparatus and system wherein a temperature sensor or a pressure sensor can be maintained at ground potential while the repeater is maintained at high voltage.

Figure 3:
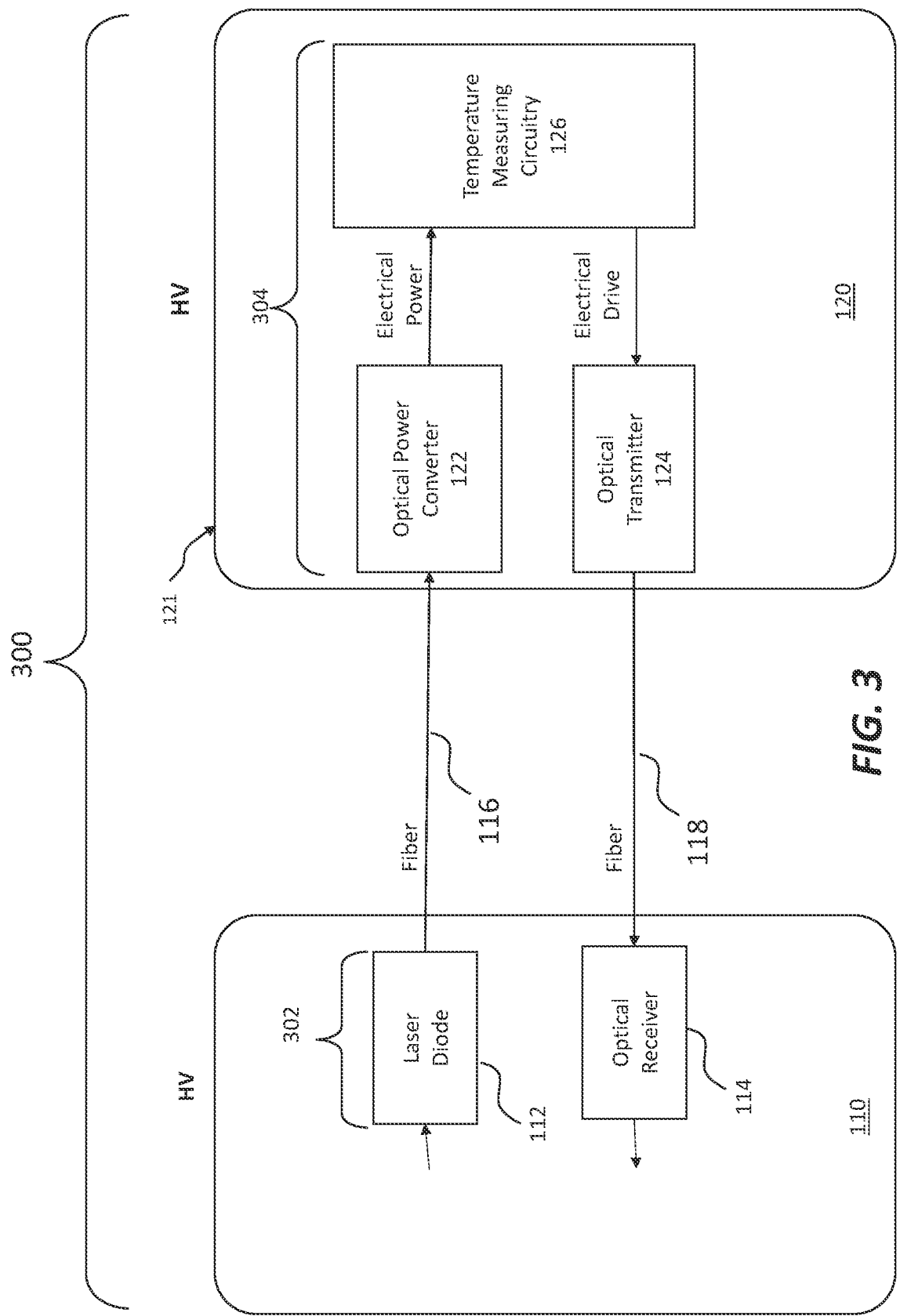
FIG. 3 illustrates details of a view of an exemplary architecture for thermal sensing.

FIG. 3 illustrates details of an exemplary architecture for thermal sensing, according to some embodiments of the disclosure. In particular, a thermal sensing arrangement 300 is shown, distributed between an optical repeater 110 and a temperature measurement apparatus 120, located within several meters or several tens of meters from the optical repeater, in some instances. The thermal sensing arrangement 300 facilitates communication of power and other signals between components in the optical repeater 110 and components with the temperature measurement apparatus 120.

The thermal sensing arrangement 300 includes an optical communication assembly, shown as repeater assembly 302, located in the optical repeater 110, and a temperature sensor assembly 304, located in the temperature measurement apparatus 120. Note that in the arrangement of FIG. 3, the optical repeater 110 is maintained at high voltage, as in normal operation, such as 10 kV, 15 k, 20 kV, etc., and the temperature sensor assembly 304 may be maintained at or near the electrical potential of the cable 106 at the temperature measurement apparatus 120, which potential is approximately the same high voltage as in the optical repeater 110. The galvanic isolation between components in the optical repeater 110 and components in the temperature sensor assembly 304 is achieved by the provision of an optical fiber pair, shown as first sensor fiber 116 and a second sensor fiber 118. In alternative embodiments, a similar operation may be achieved using just one fiber, if additional components are added. Note that the temperature measurement apparatus 120 may be arranged as a cable joint where the housing 121 of the temperature measurement apparatus 120 fully encloses, seals, and shields the temperature sensor assembly 304 from the seawater, external to the housing 121. As such, while the housing 121 will be in contact with seawater, the temperature measurement circuit 126, including a temperature sensor may measure the temperature of the seawater by being in contact with a thermally conductive surface, such as a metal surface of the interior of the housing 121.

In particular, the repeater assembly 302 may include a laser diode 112, where the laser diode 112 is coupled to receive an electrical power signal and is arranged to output an optical power signal over the first sensor fiber 116 that is transmitted to the temperature sensor assembly 304, in the temperature measurement apparatus 120. The repeater 302 assembly may further include an optical receiver 114, the optical receiver 114 being coupled to receive an optical measurement signal from the temperature measurement apparatus 120, over the second sensor fiber 118. Thus, power and communications signals are provided via electromagnetic radiation that passes between the repeater assembly 302 and the temperature sensor assembly 304, where the electromagnetic radiation provides galvanic isolation therebetween, while the temperature sensor assembly 304 may be maintained at or near the electrical potential of the cable (cable potential) 106 at the temperature measurement apparatus 120, meaning at high voltage, such as up to +/−18,000 V in some non-limiting embodiments.

Note that, while the temperature sensor assembly 304 and the repeater assembly 302 may be maintained at the same high voltage level, the optical coupling between temperature sensor assembly 304 and repeater assembly 302 is still beneficial in comparison to coupling over electric wire. For example, a known optical repeater may include a Zener diode power supply. One side of the Zener diode supply is connected to one of two cables that attach to the optical repeater, such as optical repeater 110. The other side of the Zener diode power supply is connected to the other cable attached to the optical repeater. In order to communicate power from such a diode power supply, a loose tube may be provided to allow wires or optical fibers to communicate between the optical repeater 110 and cable joint or temperature measurement apparatus 120. However, the use of electrical wires may require unduly large amount of room that is not available in the loose tube. However, the use of a set of fibers provides a feasible configuration to communicate power and other signals between optical repeater 110 and temperature measurement apparatus 120, because such fibers require much less room.

In the embodiment specifically depicted in FIG. 3, the temperature sensor assembly 304 may include an optical power converter 122, arranged to receive the optical power signal output from laser diode 412 and conducted over first sensor fiber 116. The optical power converter 122 may then output an electrical control power signal as shown. The temperature sensor assembly 304 may also include a temperature measuring circuit 126, which circuit may include one or more known components that include a component arranged to receive the electrical control power signal from the optical power converter 122. In one example, this control power signal may provide power to operate components of the temperature measuring circuit 126 or other components of the temperature sensor signal. In another example, the control power signal or similar signal may represent a control signal to trigger the temperature measuring circuit 126 to perform a temperature measurement and/or output a thermal measurement signal, meaning to output a temperature reading based upon the performing of the temperature measurement.

The temperatures sensor assembly 304 may also include an optical transmitter 124, arranged to receive the temperature measurement signal from the temperature measuring circuit 126, and arranged to output an optical measurement signal to the optical receiver 114 over the second sensor fiber 118. For example, the optical measurement signal may contain data that indicates a temperature reading, etc.

Note that for convenience, and in accordance with various embodiments of the disclosure, the first sensor fiber 116 and second sensor fiber 118 may be contained within a subsea optical cable that includes a power line and an optical fiber assembly used for bidirectional communication. In particular the first sensor fiber 116 and second sensor fiber 118 may form a dedicated fiber pair that is used to communicate temperature sensor information between the optical repeater 110 and temperature measurement apparatus 120. As noted above, the sensor fiber array such as first sensor fiber 116 and second sensor fiber 118 may be collocated within a subsea cable that extends into a housing of the temperature measurement apparatus 120 that houses a cable joint for the subsea cable.

Regarding the embodiment of FIG. 3, the considerations for choice of the exact distance between the optical repeater 110 and a sensor apparatus such as the temperature measurement apparatus 120 or pressure sensor apparatus 420 may include at least the following: 1) the minimum power required to operate the given sensor assembly (304, 404); 2) the power loss over the fiber link (116, 118, 416, 418) between the given sensor assembly and optical repeater 110, as well as 3) the need to assure that heat generated from the repeater does not affect sensor measurement, as discussed previously. As a result, according to some embodiments, the given sensor apparatus (such as 120, 420) may be placed at a distance from the repeater (such as optical repeater 110) of between 5 m and 1 km.

Figure 4:
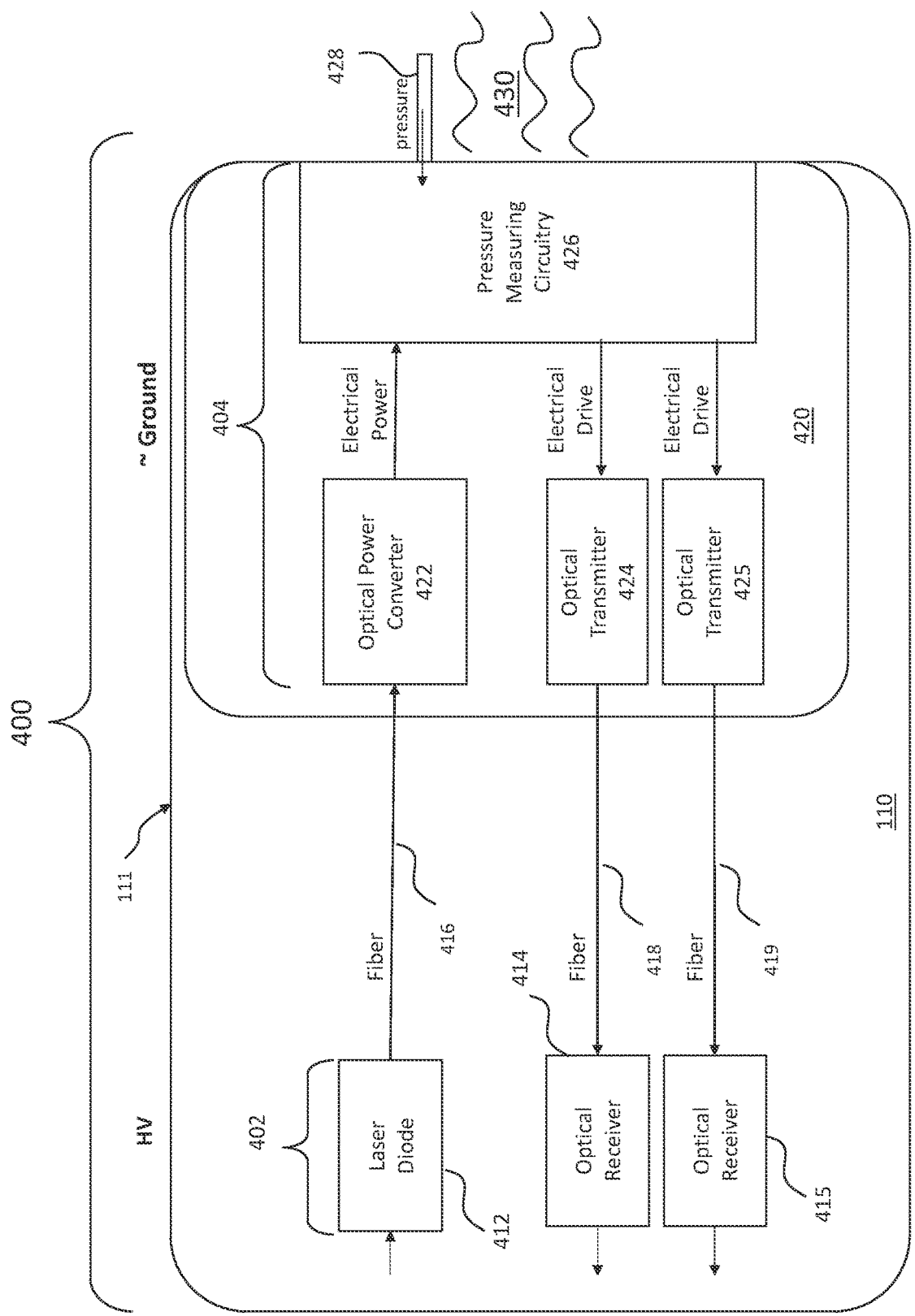
FIG. 4 illustrates details of a view of an exemplary architecture for pressure sensing.

In other embodiments, an environment sensor may be collocated with a repeater assembly at an optical repeater. FIG. 4 illustrates details of an exemplary architecture for pressure sensing, according to some embodiments of the disclosure. In particular, a pressure sensing arrangement 400 is shown, contained in an optical repeater. The pressure sensing arrangement 400 in the optical repeater 110 facilitates communication between components of an optical repeater 110, including a repeater assembly 402, and components of a pressure sensor assembly 404.

As illustrated, the pressure sensing arrangement 400, including the repeater assembly 402, and the pressure sensor assembly 404, are located in the optical repeater 110. Note that in the arrangement of FIG. 4, the repeater assembly 402 in the optical repeater 110 is maintained at high voltage, as in normal operation, such as 10 kV, 15 kV, 20 kV, etc., while the pressure sensor assembly 404 is maintained at ground potential, or near ground potential, such as no more than 200 volts of the seawater voltage. The galvanic isolation between the components of repeater assembly 402 and pressure sensor assembly 404 is achieved by the provision of three fibers, shown as first sensor fiber 416 and a second sensor fiber 418 and third sensor fiber 419.

In particular, the repeater assembly 402 may include a laser diode 412, where the laser diode 412 is coupled to receive an electrical power signal and is arranged to output an optical power signal over the first sensor fiber 416 that is transmitted to the pressure sensor assembly 404. The repeater assembly 402 may further include two optical receivers 414 and 415, the optical receiver 414 and optical receiver 415 being coupled to receive an optical measurement signal from the pressure sensor assembly 404, over the second sensor fiber 418 and third sensor fiber 419, respectively. Thus, power and communications signals are provided via electromagnetic radiation that passes between the repeater assembly 402 and the pressure sensor assembly 404, where the electromagnetic radiation provides galvanic isolation therebetween, such that the pressure sensor assembly 404 may be maintained at or near to ground potential.

In the embodiment specifically depicted in FIG. 4, the pressure sensor assembly 404 may include an optical power converter 422, arranged to receive the optical power signal output from laser diode 412 and conducted over first sensor fiber 416. The optical power converter 422 may then output an electrical control power signal as shown. The pressure sensor assembly 404 may also include a pressure sensor, shown as pressure measuring circuit 426, which circuit may include one or more known components that include a component arranged to receive the electrical control power signal from the optical power converter 122. For proper operation, the pressure sensor is to be exposed to seawater 430. According to one embodiment, sensor inputs for the pressure measuring circuit 426 may penetrate a portion of the housing of the optical repeater 110. Additionally, the main body of the optical repeater 110 is kept physically isolated from the seawater. In one aspect, the sensor inputs to the pressure measuring circuit 426 may include pressure and temperature inputs. Note that the temperature input is to be used in order to properly calibrate the pressure reading.

The pressure sensor assembly 404 may also include an optical transmitter 424, arranged to receive the temperature measurement signal from the pressure measuring circuit 426, and arranged to output an optical measurement signal to the optical receiver 414 over the second sensor fiber 418. For example, the optical measurement signal may contain data that indicates a temperature reading, etc.

The pressure sensor assembly 404 may also include an optical transmitter 425, arranged to receive the pressure measurement signal from the pressure measuring circuit 426, and arranged to output an optical measurement signal to the optical receiver 414 over the third sensor fiber 419. For example, the optical measurement signal may contain data that indicates a pressure reading, etc. Note that since the pressure sensor assembly 404 and components of repeater assembly 402 are housed within the optical repeater 110, this communication may take place over optical fibers without the need for a cable to contain the optical fibers. These fibers would not be part of the 'optical cable'. In addition to the pressure measuring circuit 426, a tube 428 will be provided, extending from the main housing 111 of optical repeater 110 to be in contact with seawater 430, in order to measure the pressure. The part of a pressure sensor, including pressure measuring circuit 426 that is disposed inside of the main housing 111 will be maintained near ground potential, in contrast to other electronics of the optical repeater 110 that may be maintained at high voltage. The pressure sensor assembly 404 and other electronics of the optical repeater 110 will therefore be separated by a sufficient distance to support the voltage difference, which may be up to −20 kV.

FIG. 5 presents an exemplary process flow 500. At block 502, an environment measurement is received at an environmental sensor that is disposed in a seawater environment. The environment sensor may be a temperature sensor, or a pressure sensor in various embodiments. In some embodiments, the environment sensor may be a temperature sensor that is disposed within a housing that includes a subsea cable joint of a subsea optical communications system. In other embodiments, the environment sensor may be a pressure sensor that is disposed in a subsea optical repeater of the subsea optical communications system.

At block 504, the environment measurement is sent as an electrical measurement signal to an optical transmitter. At block 506 an optical measurement signal is output, based upon the electrical measurement signal, over an optical fiber assembly that is coupled to a repeater assembly in the subsea optical repeater. As such, the environment sensor may be galvanically isolated from the repeater assembly, where the repeater assembly may be maintained at a high voltage, such as between −18000 V and +18000 V with respect to ground. In some examples, the repeater assembly may additionally transmit power over the optical fiber assembly to an environmental sensor assembly that includes the environment sensor, in order to provide operating power and/or control signals for operating the environment sensor, while maintaining galvanic isolation from the environmental sensor, which may be disposed at the electrical potential of the seawater.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. An apparatus for subsea environment sensing, comprising:
a repeater assembly, disposed in an optical repeater, wherein the repeater assembly receives electrical power over a cable; and an environmental sensor assembly, disposed proximate to the repeater assembly, the environmental sensor assembly being coupled to receive power from the repeater assembly over an optical link, wherein the repeater assembly comprises: a laser diode, the laser diode being coupled to receive an electrical power signal and to output an optical power signal to the environmental sensor assembly; and an optical receiver, the optical receiver being coupled to receive an optical measurement signal from the environmental sensor assembly.

2. The apparatus of claim 1, wherein the environmental sensor assembly comprises:
an optical power converter, arranged to receive the optical power signal and output an electrical control power signal;
a temperature measuring circuit, arranged to receive the electrical control power signal and to output a thermal measurement signal; and
an optical transmitter, arranged to receive the thermal measurement signal and output the optical measurement signal to the optical receiver.

3. The apparatus of claim 1, wherein the environmental sensor assembly comprises:
an optical power converter, arranged to receive the optical power signal and output an electrical control power signal;
a pressure measuring circuit, arranged to receive the electrical control power signal and to output a pressure measurement signal; and
an optical transmitter, arranged to receive the pressure measurement signal and output the optical measurement signal to the optical receiver.

4. The apparatus of claim 1, the environmental sensor assembly comprising a temperature sensor, and being disposed in a cable joint housing that houses a cable joint, the cable joint being arranged to connect a first portion of the cable to a second portion of the cable, the cable being connected to the optical repeater.

5. The apparatus of claim 4, the environmental sensor assembly being disposed at a distance of 5 m to 100 m from the optical repeater.

6. The apparatus of claim 1, environmental sensor assembly comprising a pressure sensor, wherein the environmental sensor assembly is located within the optical repeater.

7. The apparatus of claim 4, wherein the repeater assembly is arranged at an electrical potential between +18,000 V and −18,000 V, and wherein the environmental sensor assembly is arranged at a potential that is no more than 200 volts from a cable potential of the cable.

8. A subsea communications system, comprising:
a subsea cable;
an optical repeater coupled to the subsea cable, to receive electrical power from the subsea cable, the optical repeater further comprising a repeater assembly; and an environmental sensor assembly, disposed proximate to the repeater assembly, the environmental sensor assembly being coupled to receive power from the repeater assembly over an optical link, wherein the repeater assembly includes: a laser diode, the laser diode being coupled to receive an electrical power signal and to output an optical power signal to the environmental sensor assembly; and an optical receiver, the optical receiver being coupled to receive an optical measurement signal from the environmental sensor assembly.

9. The subsea communications system of claim 8, further comprising:
at least one sensor fiber, coupled between the optical repeater and the environmental sensor assembly.

10. The subsea communications system of claim 9, wherein the environmental sensor assembly comprises:
an optical power converter, arranged to receive the optical power signal and output an electrical control power signal;
a temperature measuring circuit, arranged to receive the electrical control power signal and to output a thermal measurement signal; and
an optical transmitter, arranged to receive the thermal measurement signal and output the optical measurement signal to the optical receiver.

11. The subsea communications system of claim 9, wherein the environmental sensor assembly comprises:
an optical power converter, arranged to receive the optical power signal and output an electrical control power signal;
a pressure measuring circuit, arranged to receive the electrical control power signal and to output a pressure measurement signal; and
an optical transmitter, arranged to receive the pressure measurement signal and output the optical measurement signal to the optical receiver.

12. The subsea communications system of claim 8, the environmental sensor assembly comprises a temperature sensor assembly and is disposed in an apparatus that houses a cable joint, wherein the cable joint is arranged to connect a first portion of the subsea cable to a second portion of the subsea cable.

13. The subsea communications system of claim 12, the environmental sensor assembly being disposed at a distance of 5 m to 100 m from the optical repeater.

14. The subsea communications system of claim 12, wherein the optical repeater is at an electrical potential between +18,000 V and −18,000 V, and wherein the temperature sensor assembly is arranged at a potential that is no more than 200 volts from a cable potential of the subsea cable at the environmental sensor assembly.

15. A method of monitoring a subsea environment, comprising:
receiving an environment measurement at an environmental sensor of an environmental sensor assembly, disposed in contact with seawater;
sending the environment measurement as an electrical measurement signal to an optical transmitter; and
outputting an optical measurement signal, based upon the electrical measurement signal, over an optical fiber of an optical fiber assembly that is coupled to a repeater assembly in a subsea optical repeater, wherein the repeater assembly receives electrical power over a cable, wherein the repeater assembly comprises: a laser diode, the laser diode being coupled to receive an electrical power signal and to output an optical power signal to the environmental sensor assembly; and an optical receiver, the optical receiver being coupled to receive an optical measurement signal from the environmental sensor assembly.

16. The method of claim 15, further comprising:
receiving, at the environmental sensor assembly, an optical power signal that is sent from the repeater assembly over the optical fiber assembly; and
sending a control power signal to the environmental sensor, wherein the control power signal is an electrical signal that triggers the environmental sensor to perform the environment measurement.

17. The method of claim 15, wherein the environmental sensor is a temperature sensor, wherein the environmental sensor assembly is disposed in a housing that is located at a distance of 5 m to 100 m from the subsea optical repeater, wherein the environmental sensor is arranged at no more than 200 volts from a cable potential at the environmental sensor assembly, and wherein the subsea optical repeater is arranged at a voltage, between +18,000 V and −18,000 V.

18. The method of claim 15, wherein the environmental sensor is a pressure sensor, wherein the environmental sensor assembly is disposed in the subsea optical repeater, wherein the environmental sensor is arranged at no more than 200 volts from a seawater potential at the environmental sensor assembly, and wherein the subsea optical repeater is arranged at a voltage, between +18,000 V and −18,000 V.

* * * * *